United States Patent [19]
Fahrion

[11] Patent Number: 6,089,372
[45] Date of Patent: Jul. 18, 2000

[54] CARRIER FOR PRODUCT POTS

[76] Inventor: Otmar Fahrion, Remsstr. 11, D-70806 Kornwestheim, Germany

[21] Appl. No.: 08/913,530

[22] PCT Filed: Nov. 27, 1995

[86] PCT No.: PCT/EP95/04669

§ 371 Date: Sep. 13, 1997

§ 102(e) Date: Sep. 13, 1997

[87] PCT Pub. No.: WO96/29250

PCT Pub. Date: Sep. 26, 1996

[30] Foreign Application Priority Data

Mar. 20, 1995 [DE] Germany ............................ 195 10 084

[51] Int. Cl.[7] .............................. B65D 65/00; B65D 75/00
[52] U.S. Cl. .......................... 206/427; 206/503; 206/509; 206/511; 220/507
[58] Field of Search .................................... 206/503, 511, 206/509, 433, 427, 203; 220/507, 513, 516, 517, 519

[56] References Cited

U.S. PATENT DOCUMENTS

| | | | |
|---|---|---|---|
| 3,142,407 | 7/1964 | Poupitch | 206/203 |
| 3,282,458 | 11/1966 | Rudd | 206/503 |
| 5,213,211 | 5/1993 | Umiker | 206/503 |

FOREIGN PATENT DOCUMENTS

0103535  3/1984  Denmark ................ 206/509

*Primary Examiner*—S. Thomas Hughes
*Assistant Examiner*—Jermie E. Cozart

[57] ABSTRACT

A reusable carrier for yogurt pots or the like has pot receptacles that transmit vertical forces in a stack of carriers and that surround the yogurt pots. The lower ends of the pot receptacles of each carrier co-operate with positioning ribs of the top surface of an underlying carrier, so that layers of stacked carriers can not be horizontally moved in relation to each other. The carrier as a whole is a stackable single piece made of a deep-drawn foil that is cheap to produce and easy to clean before being reused.

1 Claim, 10 Drawing Sheets

CARRIER FOR PRODUCT POTS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates to a carrier for product pots and more particularly to a carrier for yogurt pots.

2. Discussion of Relevant Art

Carriers of this kind are used in various forms of embodiment and consist, as a rule, of cardboard blanks which are connected to one another by sticking or needling. These carriers are thrown away after being used once.

It is also known practice to distribute milk products such yogurt or cottage cheese in boxes which are injection-moulded from plastic and are provided with a formed-on internal division, in a similar manner to bottle baskets. Crate-shaped carriers of this kind have the advantage that the forces to be transmitted when a fairly large number of carriers are stacked on top of one another are passed on exclusively via the carriers, but not via the products located in the latter. However, they have the disadvantage that they are expensive and bulky.

SUMMARY OF THE INVENTION

The present invention is intended to indicate a carrier for yogurt pots and the like which is inexpensive, can be stacked in a compact manner and keeps stacking forces away from the pots contained in it.

This object is achieved, according to the invention, by means of a carrier having a carrier plate that has a multiplicity of pot receptacles for one pot in each case, which have, in each case, a bottom portion interacting with the bottom of an inserted pot, wherein the pot receptacles have, in each case, a peripheral wall that extends essentially perpendicularly to the plane of the carrier plate, surrounds the peripheral wall of the associated pot and is inclined in relation to the longitudinal axis of the pot receptacle, and the lower end of which is connected, in each case, to a bottom wall, and that there are provided on the carrier plate, in the vicinity of each pot receptacle on the said carrier plate, positioning means between which the bottom wall of a pot receptacle of a carrier placed thereabove can be received.

In the carrier according to the invention, the vertical transmission of forces between carriers stacked on top of one another takes place via the peripheral walls of the pot receptacles, which walls surround the individual pots. Since there is a closed peripheral wall of this kind for each pot receptacle in the carrier, the transmission of forces from one carrier to the other takes place via a multiplicity of transmission points, so that the individual transmission point does not have to receive any extreme force. For this reason, it is possible to manufacture the force-transmitting walls of the pot receptacles from relatively weak material, for example to manufacture the entire carrier from a foil, a metal sheet or a blank made of coated cardboard by deep drawing or vacuum forming.

As a result of the fact that the bottom walls of the pot receptacles are, in each case, positioned in the plane of the carrier by positioning means adjacent to the receptacle openings, a stack of carriers according to the invention is stable, even in the lateral direction. Stacks of this kind can therefore be handled in a satisfactory manner, both manually and mechanically.

The further development of the invention wherein the peripheral wall is provided with at least two gripping grooves that are located opposite one another with respect to the axis of a pot receptacle facilitates the removal of pots from a carrier. This further development is also advantageous as regards the mechanical filling of carriers.

The further developments of the invention wherein the bottom wall has a run-off aperture, wherein the bottom wall is annular, and wherein the bottom walls fall away towards their run-off apertures, are advantageous as regards simple cleaning of the carrier for subsequent re-use.

What is achieved with the further development of the invention wherein the positioning means that are positioning ribs that project upwards from the carrier plate is that, between empty carriers stacked directly on top of one another, a minimum distance between the receptacle walls of adjacent carriers is guaranteed, a fact which makes it easier to divide up the stack again.

The further development of the invention wherein the positioning means that are positioning ribs that project upwards from the carrier plate permits safe positioning of adjacent carriers in directions parallel to the plane of the carrier.

At the same time, what is achieved with the following further development of the invention is that the carriers can still be stacked on top of one another in a very compact manner when empty. The carrier plate is rectangular and the positioning ribs are disposed symmetrically to the transverse median plane of the carrier plate in the case of the individual pot receptacles in such a way, and are selected in their dimensions in such a way, that they plunge, when the carrier shifts, into the gripping grooves of an adjacent carrier or receive, between them, the lower portion of a pot receptacle located thereabove.

The further developments of the invention wherein the regions of the carrier plate that are located between the pot receptacles are provided with run-off apertures, and wherein the regions of the carrier plate that are located between the pot receptacles fall away towards the run-off apertures providing in them, again serve for simple cleaning of the carrier with water for re-use.

The further development of the invention wherein stiffening ribs or stiffening corrugations extend between the pot receptacles, is advantageous as regards high mechanical robustness of the carrier.

With carriers which are constructed in accordance with the following development it is possible to produce larger integrated systems of carriers, by hooking up a plurality of individual carriers along their edges. This means that, even on a pallet on which a number of stacks of carriers are located side by side, what is obtained is not independent, high stacks but rather broad layers of stacks which are continuous from the point of view of forces. This is advantageous as regards the safe formation of high stacks. The carrier plate is rectangular and is provided, on one of two sides of the rectangle which are located opposite one another, with a folded portion in each case and, in that side of the rectangle which is located opposite the said side, with a grooved portion, it being possible for the folded portions and the grooved portions to be hooked up to one another.

The further development of the invention according to the following also serves to increase the mechanical robustness of the carrier, while maintaining the stackability of empty carriers. There is formed onto the edge of the carrier plate a stiffening wall which hangs downwards and extends in the peripheral direction and which is inclined in relation to the normal line of the carrier plate and preferably extends over about half the axial dimension of the pot receptacles.

The further developments of the invention wherein it is a one-piece shaped part which consists of plastic, sheet metal or coated cardboard, and wherein it is manufactured by deep drawing or vacuum forming a blank are advantageous both as regards low-cost and simple manufacture and also as regards simple cleaning of the carriers (smooth, impervious surfaces).

The further developments of the invention according to the following make it possible for part of the peripheral wall of pots inserted in the carriers to be visible from the side of a stack of carriers containing pots. It is also possible to grasp and remove, in a particularly simple manner, those portions of the pots in the topmost carrier in the stack which are freely accessible between the positioning means. The positioning means are constructed as supports which project above the carrier plate and are able to carry the bottoms of pot receptacles, which are located thereabove, of a carrier located thereabove, and wherein the height of the positioning means amounts to about 25 to 75 percent, and preferably about 50 percent, of the overall height of the carrier.

BRIEF DESCRIPTION OF THE DRAWINGS

The invention will be explained in greater detail below with the aid of preferred embodiments and with reference to the drawings, in which.

DETAILED DESCRIPTION OF THE DRAWINGS

Figure 1:
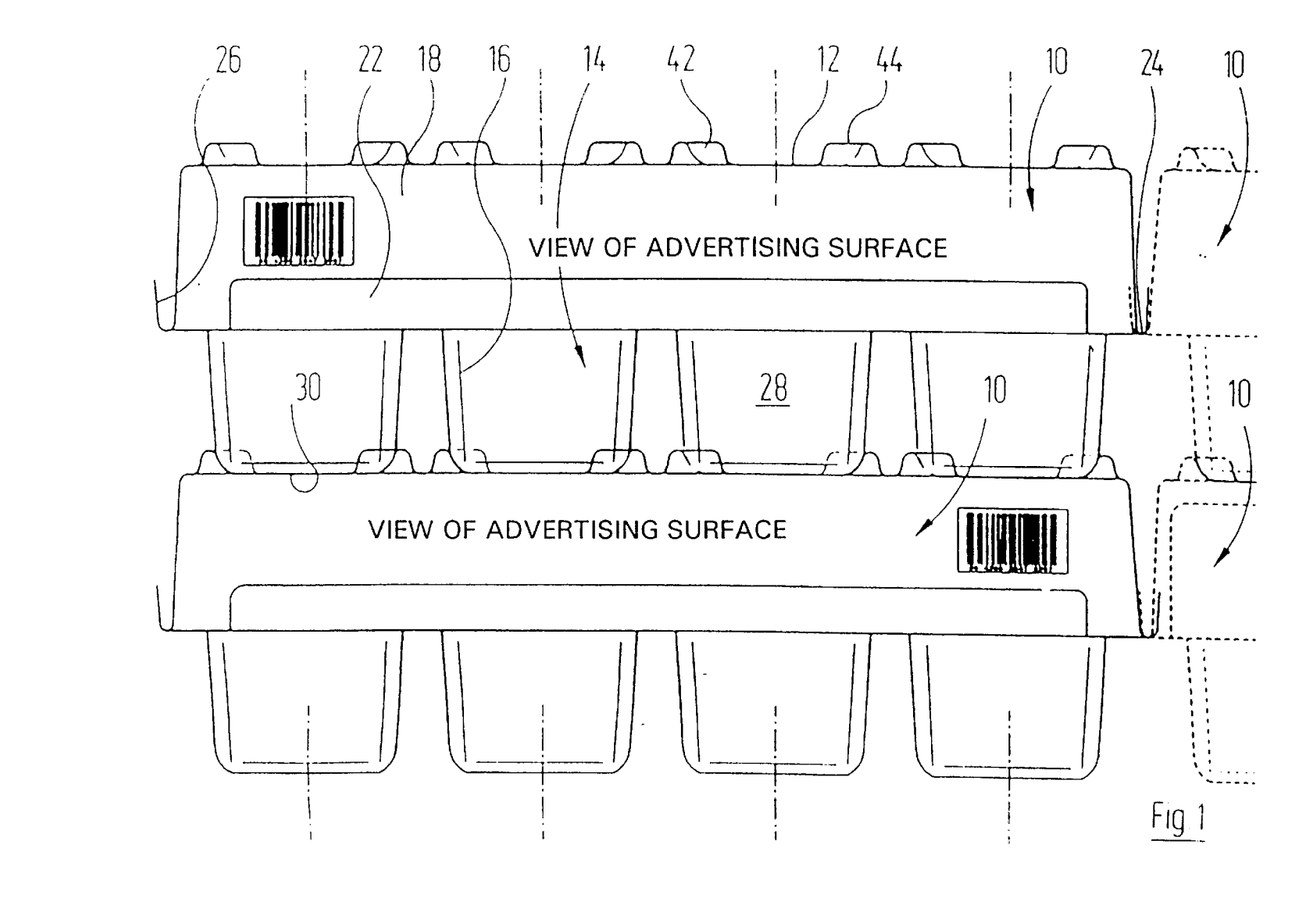
FIG. 1 shows a side view of a detail of two layers of a carrier stack filled with yogurt pots.
Figure 2:
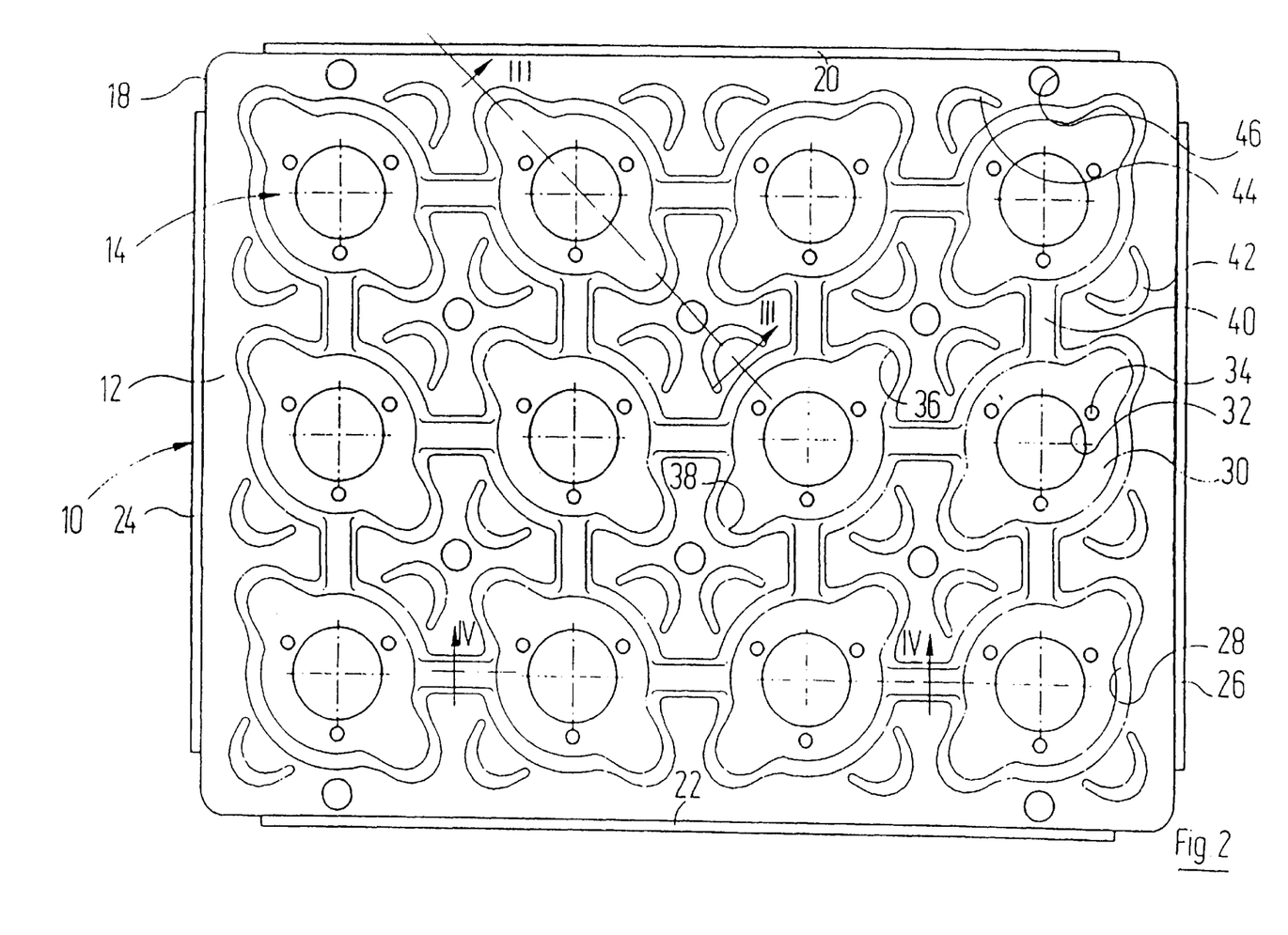
FIG. 2 shows a top view of an empty carrier, such as has been used for forming the stack in FIG. 1.
Figure 3:
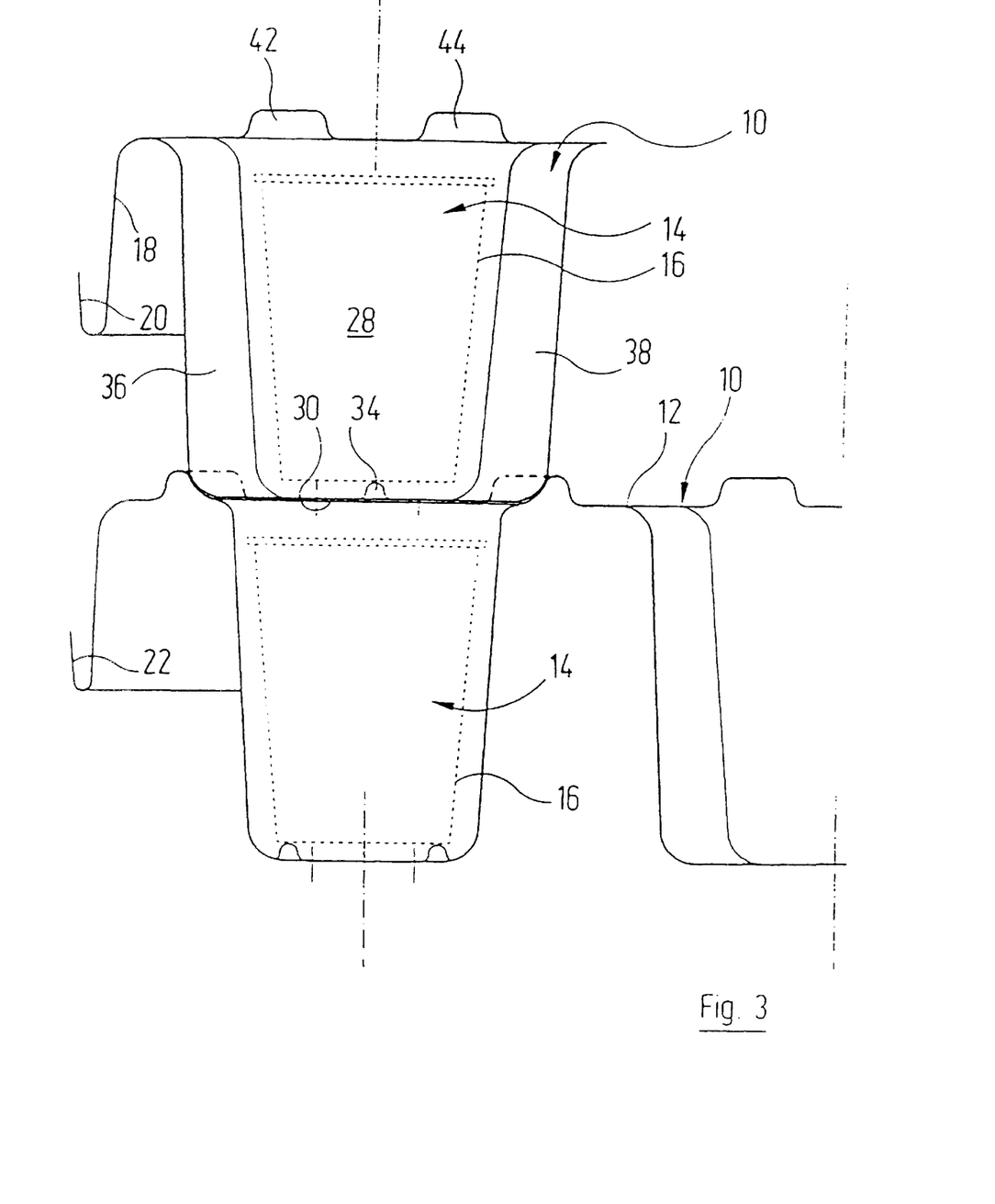
FIG. 3 shows an enlarged vertical section through two pot receptacles located on top of one another in two adjacent carriers in the stack, the cut being made along the line III—III in FIG. 2.
Figure 4:
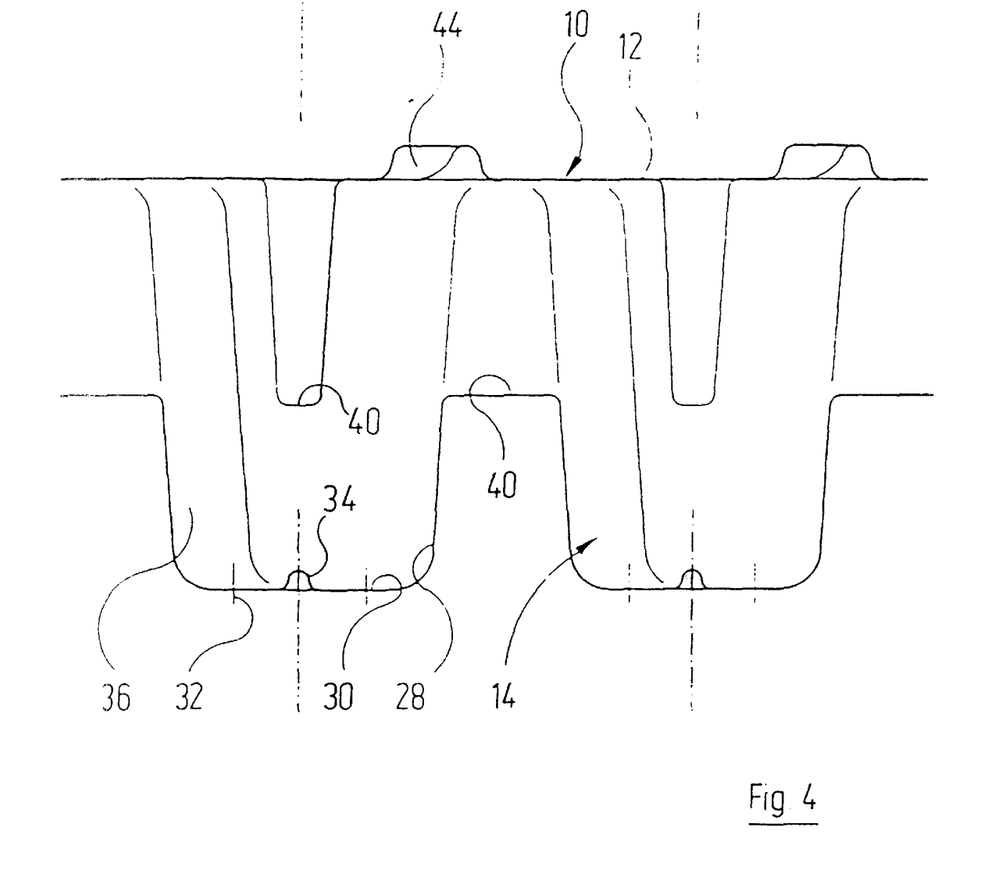
FIG. 4 shows a vertical section through adjacent pot receptacles in a pot-carrier, the cut being made along the line IV—IV in FIG. 2.

In FIG. 1, 10 designates, as a whole, carriers which have receptacles for yogurt pots 16, which receptacles are suspended from an upper carrier plate 12 and are designated as a whole by 14. A circumferential stiffening wall 18, which extends approximately over half the height of the pot receptacles 14, is formed onto the edges of the carrier plate 12. The stiffening wall 18 is set, throughout, at an angle of about 5 to 10° to the normal line of the carrier plate 12 (that is to say, to the vertical in the figure), and therefore has approximately the shape of a truncated pyramid. Formed onto one longitudinal edge of the stiffening wall 18 is a folded portion 22, and onto the opposite longitudinal wall, a grooved portion 20. In practice, the folded portion 22 can also be constructed as a groove, in which case, however, the latter then has a somewhat smaller breadth than the grooved portion 22. Formed onto one narrow side of the stiffening wall 18 in a corresponding manner is a folded portion 24, and onto the opposite side, a grooved portion 26. Carriers 10 which are adjacent in one stacking plane can be hooked up to one another via the folded portions and grooved portions. In this way it is also possible to stack a large number of carriers on top of one another without there being any risk of a stack of carriers falling over if a pallet carrying the said stack of carriers assumes an inclined position or moves in a jerky manner.

As can be seen, in particular, from FIGS. 2 to 5, the individual pot receptacles 14 have a peripheral wall 28, in each case, which is essentially conical. Formed onto the lower end of the peripheral wall 28 is an annular bottom wall 30, the free edge of which predetermines a run-off aperture 32. Three knobs 34, which are uniformly distributed in the angular direction, are pressed upwards from the annual bottom wall 30. Incorporated in the peripheral wall 28 at points located opposite the axis of the receptacle are two gripping grooves 36, 38 in each case, the walls of which are again likewise set at an inclination to the normal line of the carrier plate 12. Adjacent pot receptacles 14 are connected in the carrier plate 12 in each case by deep corrugations 40, that is to say in both the longitudinal direction and the transverse direction of the carrier plate 12. In this way, the pot receptacles 14 and the corrugations 40 form a mechanical latticework which can be loaded in a satisfactory manner even when the wall thickness of the carrier 10 is only small.

Two positioning ribs 42, 44 in each case, the inner contour of which corresponds to the outer contour of the lower end of the gripping grooves 36, 38, are provided radially outside that portion of the peripheral wall 28 which is devoid of the gripping grooves 36, 38. In this way, the lower ends of the gripping grooves 36, 38, and those portions of the bottom wall 30 of a carrier which are associated with them, are positioned in the plane of the carrier plate by the positioning ribs 42, 44 of a carrier located therebeneath, if carriers located on top of one another in a stack are stacked on top of one another in such a way that they are rotated, in each case, by 180° about the vertical axis in relation to one another.

In order to guarantee this, both the gripping grooves 36, 38 and also the positioning ribs 42, 44 are disposed symmetrically to the transverse median plane of the carrier 10. If, on the other hand, carriers are stacked on top of one another with identical alignment, the pot receptacles 14 on one carrier, including their gripping grooves 36, 38, are pushed into the pot receptacles 14 and gripping grooves 36, 38 of the carrier located therebeneath.

Those portions of the carrier plate 12 which are located between the upper ends of the pot receptacles 14 are provided with run-off apertures 46 through which cleaning liquid can run off.

Figure 5:
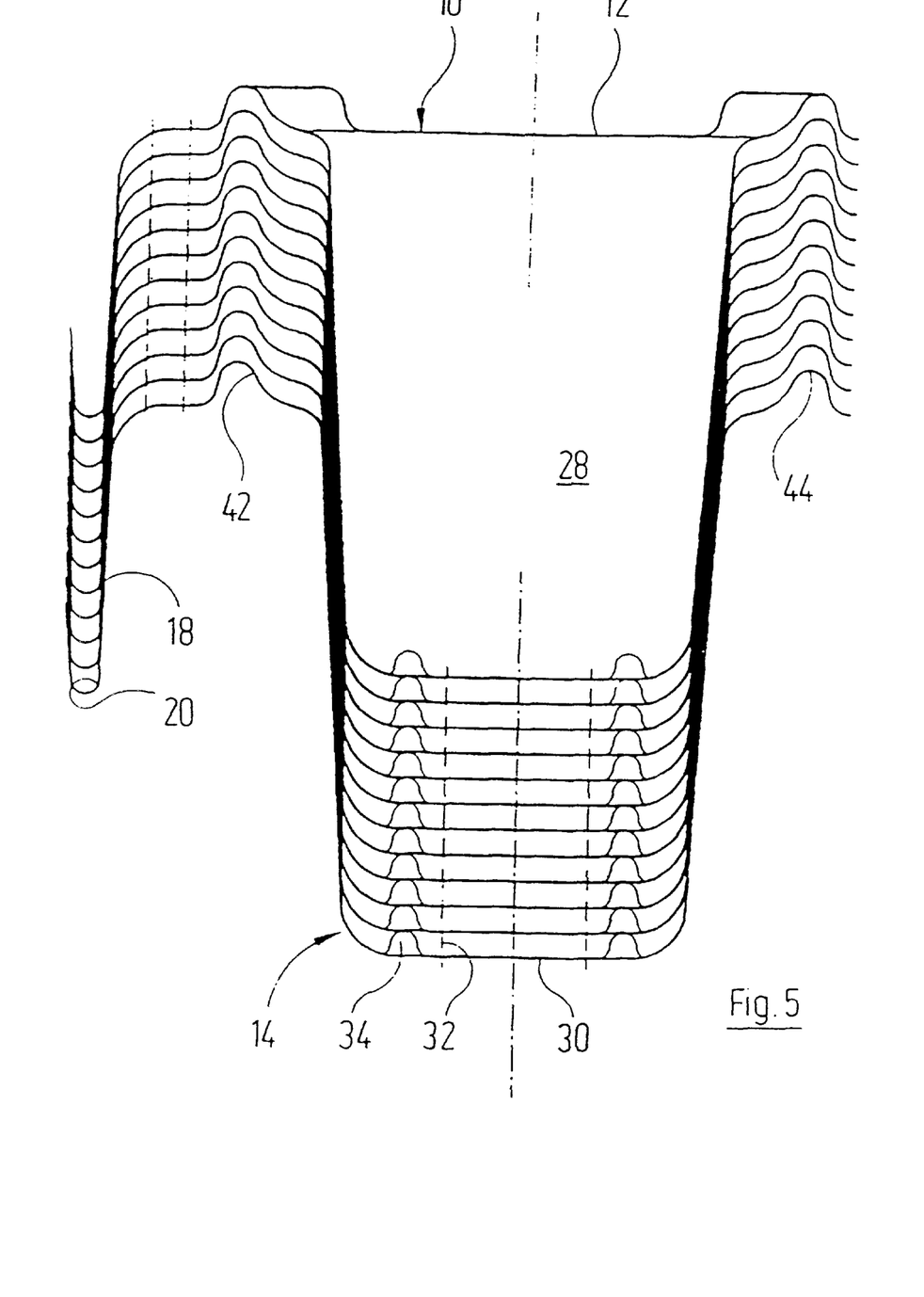
FIG. 5 shows a section through part of a stack of empty pot-carriers in the region of a pot receptacle near the edge.
Figure 6:
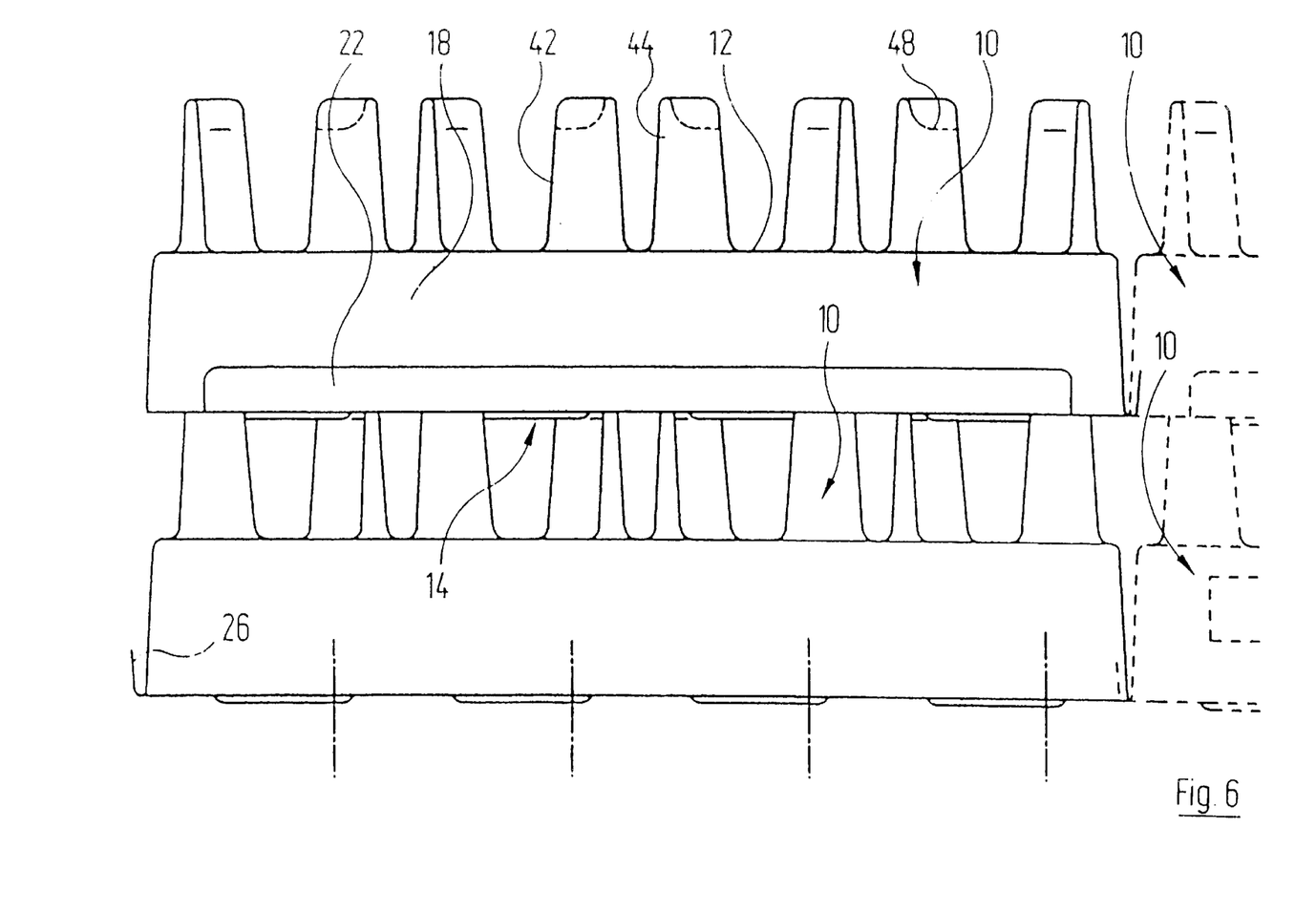
FIGS. 6 to 9 show representations which correspond to FIGS. 1 to 3 and 5, but which show a modified carrier.

As can be seen from FIG. 5, the various walls of a carrier which extend perpendicularly to the plane of the carrier plate are set in an inclined manner in each case, so that, for the return transport of empty carriers, the latter can be stacked on top of one another in a very compact manner (in identical orientation—see above). At the same time, the knobs 34 serve to space the various carriers 10 slightly apart, so that they can easily be separated again.

As can also be seen from FIG. 1, the relatively broad stiffening wall 18 can be used for the purpose of attaching advertising and/or product information in a clearly visible manner.

In the exemplified embodiment described above, the carrier 10 was a one-piece plastic part manufactured by deep drawing or vacuum forming. In a modification of this exemplified embodiment, it is also possible to manufacture the carrier by deep drawing a suitable blank made of sheet metal or coated cardboard. The sheet metal used may either consist of stainless steel or else be painted or plastic-coated sheet metal. If coated cardboard is used as the material for the carrier 10, the coating is to be selected in the light of the hygiene regulations and of its capacity to withstand cleaning. Suitable blanks may comprise, for example a core layer of cardboard which is lined, on both sides, with a suitable, thin plastic foil.

The carrier 10 shown in FIGS. 6 to 10 is the same as the one described above with reference to FIGS. 1 to 5, but with a few variations which will be described below.

Corresponding parts of the carrier again bear the same reference symbols and will not be described again in detail.

In the modified carrier, the positioning ribs 42 and 44 have a height which corresponds to about 50% of the overall height of the carrier 10, which is intended to receive pots 16 which have the same dimensions as in the example according to FIGS. 1 to 5. Thus large regions of the peripheral wall, which in practice is printed in an attractive and informative manner, of the pots 16 standing in the pot receptacles are visible from the side of a stack of carriers. It is also possible, for the purpose of removing the pots, to simply reach through between the positioning ribs.

The positioning ribs 40, 42 have at their ends, in each case, wall portions 48 which are raised up with them from the carrier plate and which support the bottoms of the pot receptacles 14 of the carrier 10 located thereabove.

The carrier construction shown in FIGS. 6 to 10 has the advantage, from the production engineering viewpoint, that quantities of material have less far to flow during the deep drawing operation since, starting from a flat blank, half the interval between carriers is produced by deep drawing the pot receptacles 14 in one direction, and the other half of the interval between carriers, by deep drawing the positioning ribs 40, 42 in the other direction.

The folded portions 22 and 24 are also omitted in the case of the carriers 10 according to FIGS. 6 to 10; the grooved portions 20 and 26 interact directly with the lower edge of the circumferential stiffening wall 18.

Figure 7:
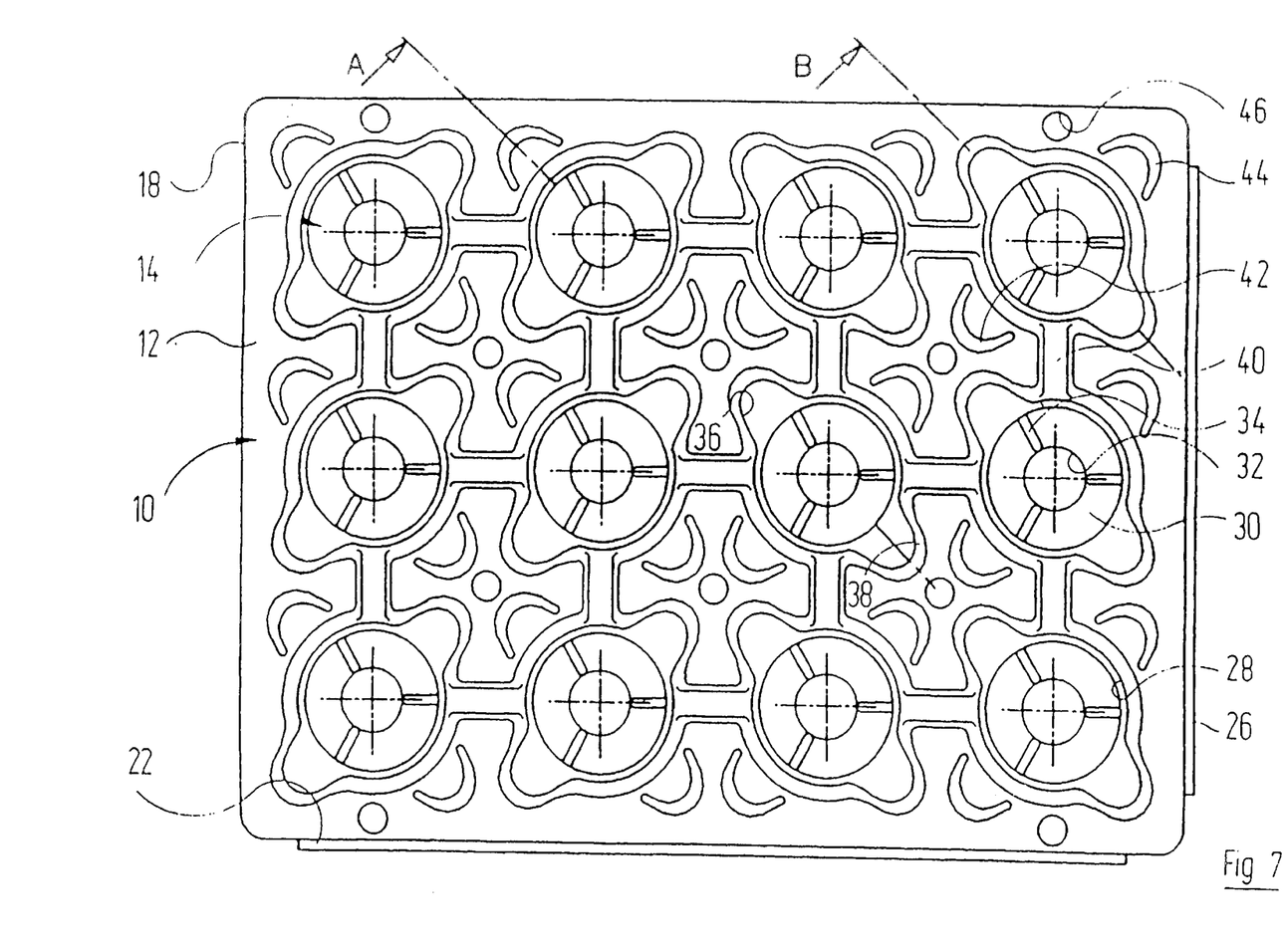
Figure 8:
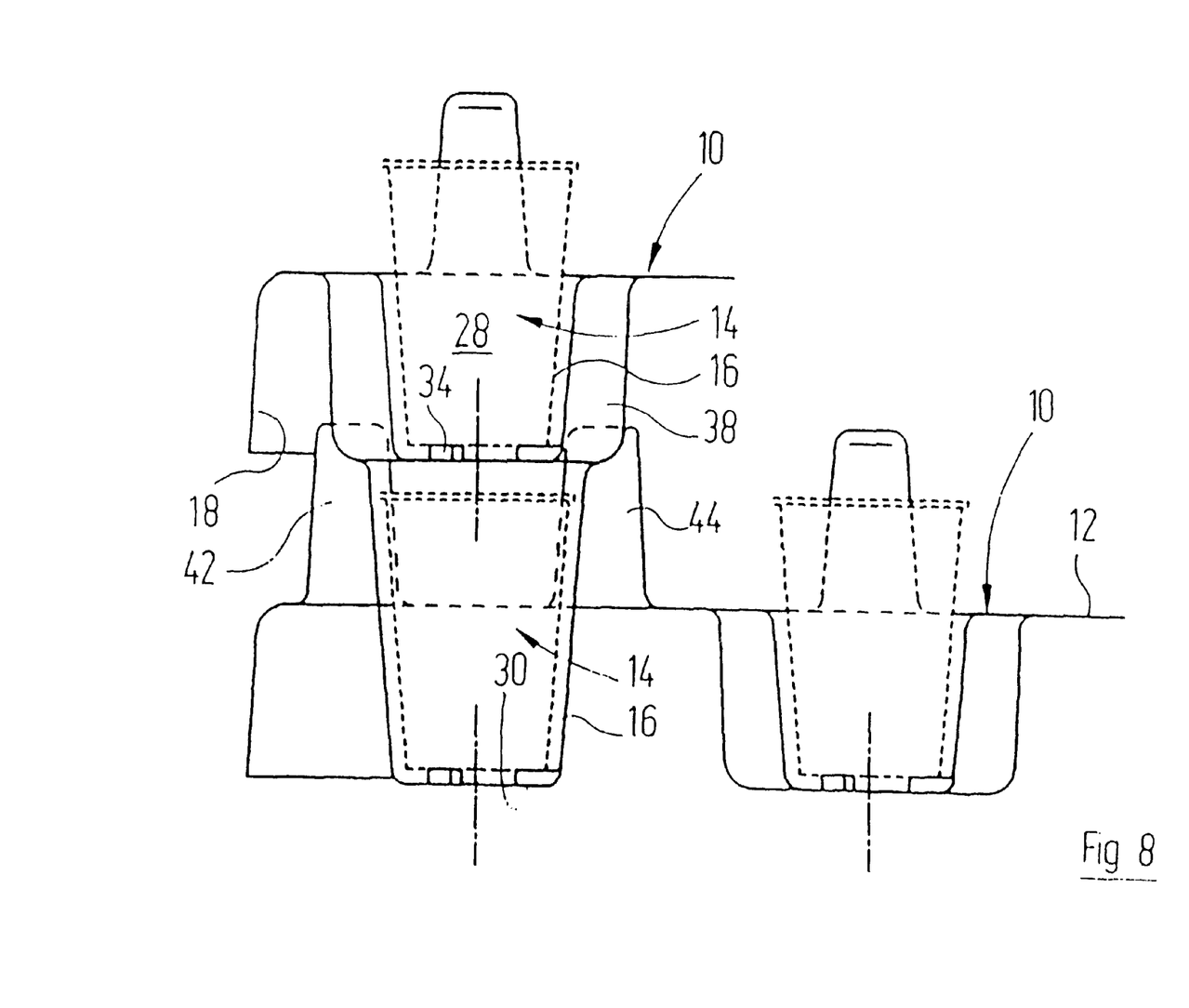
Figure 9:
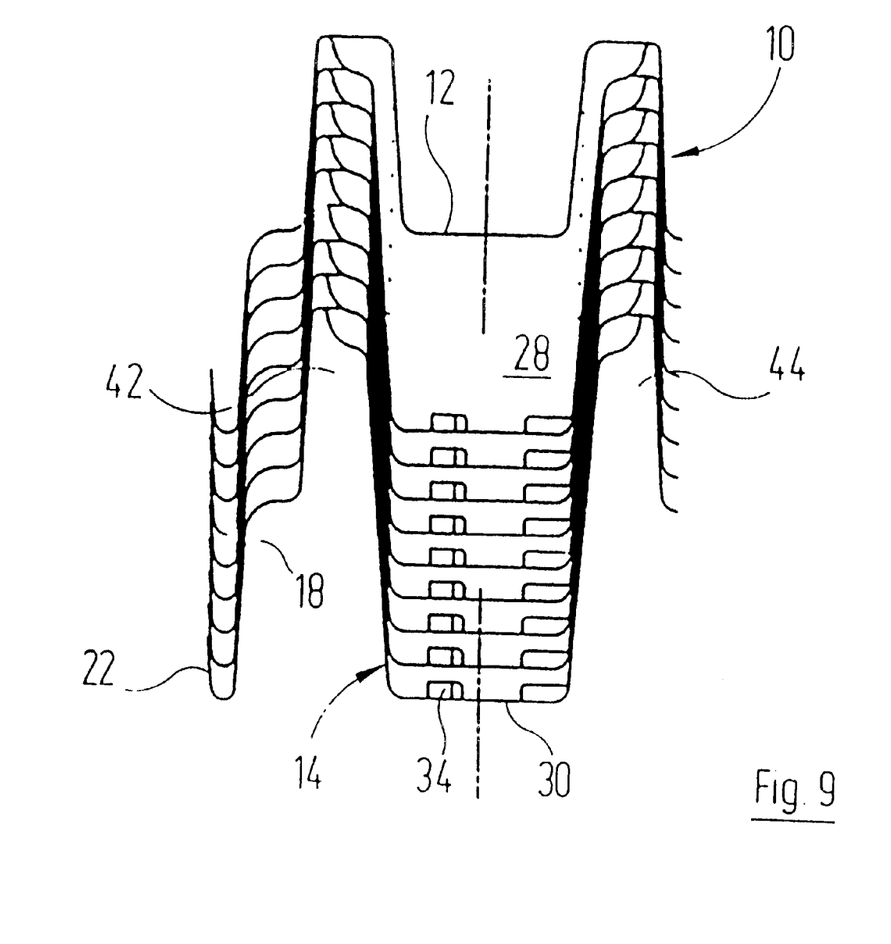
Figure 10:
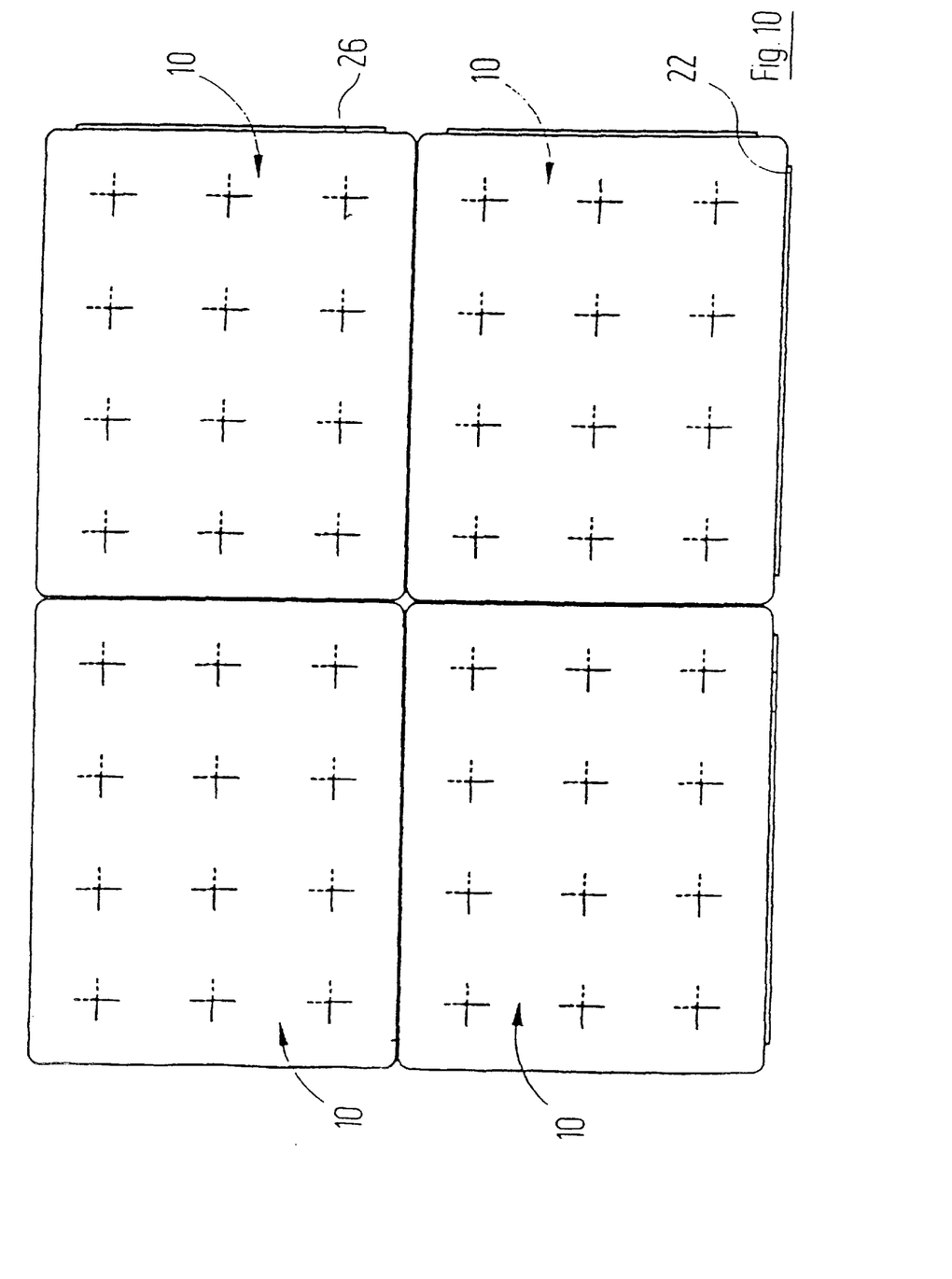
FIG. 10 shows a top view of four carriers according to FIGS. 6 to 9, which are disposed in one plane and are hooked up to one another.

The sectional lines A and B in FIG. 7 indicate the direction in which the pot receptacle 14 of the lower carrier 10, which receptacle is located at the bottom left-hand side in FIG. 8, and the pot receptacle 14 of the upper carrier 10, which receptacle is located at the top in FIG. 8, are cut.

What is claimed is:

1. A carrier for product pots having a carrier plate (12) which has a plurality of pot receptacles (14), one for each pot, each pot receptacle having a bottom wall (30) interacting with a bottom of a pot (16) inserted in said pot receptaclea peripheral wall (28) which extends substantially perpendicularly to a plane of said carrier plate, surrounds a peripheral wall of said inserted pot (16) and is inclined with respect to a longitudinal axis of said pot receptacle (14), and a lower end which is connected to said bottom wall (30) of said pot receptacle, said carrier plate (12) further having, in a vicinity of each pot receptacle (14), positioners (42, 44) between which a bottom wall (30) of a pot receptacle (14) of a further carrier (10) placed above said carrier can be received, wherein said positioners comprise positioning ribs (42, 44) which project upwards from said carrier plate (12), and said carrier plate (12) is rectangular and said positioning ribs (42, 44) are disposed symmetrically to a transverse median plane of said carrier plate (12) that intersects said pot receptacles (14) in such a way and are dimensioned in such a way that they engage, said carrier (10) shifts, into gripping grooves (36, 38) of an adjacent carrier (10) or receive, between them, a lower portion of a pot receptacle located thereabove.

* * * * *